Patented Mar. 4, 1930

1,749,678

UNITED STATES PATENT OFFICE

ARCHIBALD D. SHANKLAND, OF BETHLEHEM, PENNSYLVANIA, ASSIGNOR TO BETHLEHEM STEEL COMPANY

MANUFACTURE OF ALLOY STEELS

No Drawing.      Application filed May 19, 1926. Serial No. 110,287.

This invention relates to the manufacture of steel alloys, and is more particularly directed to the manufacture of tungsten steel in a furnace, wherein the tungsten is introduced into the furnace charge as an oxide of tungsten, as for example, in the form of roller mill or hammer mill scale from high speed steel.

The use of high speed steel scale in a furnace charge for introducing therein the oxides of a desired alloying element is known to the art. In the case of tungsten, however, it has been found difficult to attain an effective recovery of the tungsten so introduced, appreciable amounts of tungsten being lost on the furnace bottom. A further disadvantage hitherto experienced in using scale in a furnace charge, more especially in a furnace having an acid lining, is the serious degradation of the lining by the metallic oxides of the scale. This condition is particularly aggravated when the reduction of the oxides is effected by the influence of a reducing agent having a highly exothermic reaction such as for example silicon.

An object of this invention is to effect a substantially complete recovery of tungsten from its oxide and alloying same with steel.

A further object of this invention is the utilization of high speed steel scale in an acid furnace charge without unduly damaging the linings of the furnace.

A further object of this invention is to avoid the loss in tungsten on the furnace bottom, hitherto characteristic of tungsten heats.

An essential feature of this invention is the method of charging the furnace, so as to obtain a complete recovery of tungsten and effect its alloying with the steel at normal furnace temperatures, such as may be attained, for example, in an acid open hearth furnace, and at the same time avoid excessive damage to the furnace linings.

I have discovered that, if the portion of the furnace charge which is to be subjected to reduction, for example an oxide of tungsten or high speed steel scale, be mixed with a reducing agent and introduced in the center of the furnace charge, so that it may be in a sense entirely surrounded by the remainder of the charge, reduction of the oxide may be attained to a high degree without excessive damage to the linings of the furnace. Furthermore, I have discovered that if a plastic and impervious layer of metal be placed on the bottom of the furnace hearth so as to underlie the reducible portion of the furnace charge, the reduced metal is prevented from adhering to the bottom lining of the furnace, in the manner characteristic of tungsten heats.

Preferably, I use ferrosilicon as a reducing agent for the tungsten trioxide of the scale, because of its exothermic properties. By following the method herein described, the reduction of the oxide and the fusion of the surrounding mass take place separately and independently of each other, the material of the charge overlying the reducible portion is first submitted to the heat of the furnace, the portion beneath the reducible portion remaining in its plastic condition. As the furnace temperature increases, heat is transmitted by conduction to the center of the mass, wherein the reducible portion of the charge is disposed, until a degree of temperature is attained in the latter, at which a reduction of the oxide is initiated. Owing to the strongly exothermic character of the reaction between the silicon of the reducing agent and the oxide of the alloying element the transfer of heat, once reduction has been initiated, tends to be from the reducible portion outwards to the fusible portion. In consequence the reduction of the metal is substantially effected before a complete fusion of the surrounding mass has been attained. The portion of the charge covering the bottom of the hearth is the last to attain complete fusion and retains its plastic condition until substantially all the tungsten has been reduced, and therefore prevents loss of tungsten in the furnace bottom. I have also found it advantageous to scatter the banks of the furnace with pulverized ferrosilicon before charging the scale or oxide into the furnace so as to protect them from the influence of the oxides.

The steps of the process herein disclosed are therefore as follows. Pig iron is first charged, followed by flashings, punchings or material of similar character and small billets, these latter additions being spread evenly over the pig iron. Heat is then applied to the furnace to a degree sufficient to effect a partial fusion of the mass, to a condition of cohesion and impervious plasticity, without, however, melting the charge. This serves as a false lining to the bottom of the furnace hearth. It also offers the advantage of insuring the retention of all the carbon introduced by this portion of the charge during the subsequent fusion period of the whole charge. To protect the banks of the furnace, pulverized ferrosilicon is freely scattered thereover.

A mixture is made of crushed metallic oxides, including oxide of tungsten, or of high speed steel scale with crushed ferrosilicon, the latter preferably in excess of the theoretical requirement for the reduction of the oxides. This mixture is carefully charged into the plastic bottom above described, so as to form a pile thereupon, the sides of which are out of contact with the sides of the furnace. Sufficient lime is distributed on this pile, so as to flux the silicon formed in the reduction of the oxides; a small amount of carbon in the form of coke or anthracite may also be added thereto.

The major portion of the furnace charge, comprising steel flashings and billets, amounting to perhaps two thirds of the total, is then added in such a manner as to completely cover the pile of reducible material in the furnace. This portion of the charge provides the metal base with which the tungsten reduced from its oxide will alloy. The portion forming the false bottom lining serves to introduce the greater part of the carbon, and also acts as a slight diluent of the alloyed steel, when a complete fusion of the mass has been attained. The upper portion of the charge supplying the metal base of the alloy also serves as a jacket or container to the reducible portion of the charge, thereby protecting the furnace roof from the intense heat evolved in the reduction mass. When the entire charge is in the furnace, the temperature of the latter is increased until complete fusion of the charge has been attained. Following this, the usual adjustments in carbon and silicon may be made to the bath of alloyed steel, by addition of ore and spiegel.

The following details of a typical heat will serve to exemplify the practice of my invention.

An acid open hearth furnace is charged with low phosphorous pig iron 3500 lbs., flashings 3000 lbs., and steel billets 3800 lbs. Heat is applied to the furnace so as to fuse the above to a plastic impervious mass. A suitable quantity, depending on the size and design of the furnace, of pulverized ferrosilicon is scattered in the banks of the furnace. A mixture of 2500 lbs. of scale, containing tungsten trioxide equivalent to about 10% metallic tungsten, and 1470 lbs. of crushed 50% ferrosilicon is heaped on to the plastic mass and 225 lbs. of burned lime added. The covering charge of: flashings 4500 lbs. and steel billets 6000 lbs. is spread evenly over the mass in the furnace, so as to entirely enclose the reducible portion of the charge. The furnace temperature is increased and complete fusion of the mass is attained in about eight hours.

A typical analysis of the bath shows tungsten .99, carbon .88, silicon 2.03, and the slag analysis indicates an entire absence of tungsten trioxide. The carbon and silicon contents are brought down the desired degree by suitable additions of iron ore. The bath is then refined by additions of spiegel. The furnace is tapped at about 2900° F. and the metal held in the ladle to cool to about 2700° F. before pouring into the ingot molds. Final analysis—tungsten .94, carbon .38, manganese .84, silicon .215, phosphorus .037 and sulphur .022.

From the above, it will be seen that I have devised a new process for making alloy steels of the kind wherein the desired alloying element is introduced into the furnace charge as an oxide, the special feature of my process being the manner in which the furnace charge is made up. The advantages of this process are demonstrated more particularly in the case of a tungsten steel alloy because of the known difficulties inherent to this metal. In the description of my invention, I have shown the use of scale containing tungsten trioxide as a suitable material for introducing the alloying element. The same method of procedure may be applied if it be desired to introduce the metallic oxide as a calcined concentrate from a tungsten ore.

It will also be evident to those skilled in the art that, while I have selected tungsten as a specific alloying element, for the purpose of illustrating the process and because of the particular difficulties normally attending its alloying with steel, oxides of other metals in the chromium group and in the vanadium group may be reduced and alloyed with steel by following the process steps herein disclosed.

This invention is susceptible of wide application without departing from the spirit thereof and I, therefore, desire that only such limitations shall be placed thereupon, as are imposed by the prior art, or as are specifically set forth in the appended claims.

Having thus described the invention what I claim as new and desire to secure by Letters Patent is:

1. A method of introducing an alloying element into a bath of steel by including scale containing said element in a furnace charge, which consists in, making a reduction mixture of the scale and a suitable reducing agent, charging the mixture into a furnace in such a manner as to be substantially surrounded by the ferrous metallic constituents of the charge, the portion of the latter underlying the reduction mixture having been previously heated to an impervious coalescence, and effecting fusion of the entire furnace charge in the normal manner.

2. A method of introducing tungsten into a bath of steel by including tungsten scale in a furnace charge, which consists in, making a reduction mixture of the scale and ferrosilicon, charging the mixture into a furnace in such a manner as to be substantially surrounded by the ferrous metallic constituents of the charge, the portion of the latter underlying the reduction mixture having been previously heated to an impervious coalescence, and effecting fusion of the entire furnace charge in the normal manner.

3. A process for the manufacture of steel alloys which consists in covering the hearth bottom of an acid lined furnace with a cold charge of iron and steel, heating the latter to coalescence without fusion, protecting the banks of the furnace with pulverized ferrosilicon, mixing oxide of an alloying element with a suitable reducing agent, heaping the mixture onto the metal covering the hearth bottom, adding flux, charging steel onto the exposed surface of the mixture, heating the entire charge to fusion and adjusting the composition of the fusion bath in the normal manner.

4. A process for the manufacture of tungsten steel which consists in covering the hearth bottom of an acid lined furnace with a cold charge of iron and steel, heating the latter to coalescence without fusion, protecting the banks of the furnace with pulverized ferro-silicon, mixing oxide of tungsten with an exothermic reducing agent, heaping the mixture onto the metal covering the hearth bottom, adding flux, charging steel onto the exposed surface of the mixture, heating the entire charge to fusion and adjusting the composition of the fusion bath in the normal manner.

5. A process for the manufacture of tungsten steel which consists in covering the hearth bottom of an acid lined furnace with a cold charge of iron and steel, heating the latter to coalescence without fusion, protecting the banks of the furnace with pulverized ferro-silicon, mixing tungsten bearing scale with crushed ferro-silicon, heaping the mixture onto the metal covering the hearth bottom, adding flux, charging steel onto the exposed surface of the mixture, heating the entire charge to fusion and adjusting the composition of the fusion bath in the normal manner.

6. A method of charging an acid lined furnace for the manufacture of steel alloys which consists in charging a portion of the material forming the major metallic component of the furnace charge onto the furnace hearth, applying heat thereto to effect a coalescence of the material to a plastic impervious mass without attaining its complete fusion, scattering a pulverized silicon alloy on the banks of the furnace, mixing an oxide of the alloying element with a reducing agent, heaping this mixture onto the impervious mass in such a manner as to avoid contact with the sides of the furnace, distributing a fluxing agent over the mixture, and charging the balance of the major metallic component of the furnace charge so as to entirely cover the exposed surface of the reduction mixture.

7. A process for the manufacture of metallic alloys which comprises charging the base metal of the alloy in a non-liquid condition on the bottom of a treatment chamber, charging reducing material and a compound of an alloying ingredient on the non-fluid base metal, and effecting a reaction between the reducing material and the alloying ingredient compound while retaining base metal in a non-liquid condition between the reacting mass and the bottom of the chamber.

8. A process for the manufacture of metallic alloys which comprises isolating a charge of reducing material and a compound of an alloying constituent from the walls and bottom of a treatment chamber by means of other constituents of the alloy in a non-fluid condition, and effecting reaction between the said reducing material and compound before liquefying the mass of isolating constituents.

9. In a process for the production of an alloy containing an ingredient having a specific gravity greater than that of the base metal, the steps of covering the bottom of an alloying chamber with the base metal, placing a charge containing the metal of greater specific gravity on the covering of base metal while said base metal is in a non-liquid condition, and heating said charge to effect alloying of the heavier metal with base metal before completely melting the covering of base metal.

In testimony whereof I hereunto affix my signature this 11th day of May, 1926.

ARCHIBALD D. SHANKLAND.